US009451272B2

(12) United States Patent
Davies et al.

(10) Patent No.: US 9,451,272 B2
(45) Date of Patent: Sep. 20, 2016

(54) HYBRID OPEN-LOOP/CLOSED-LOOP COMPRESSION OF PICTURES

(75) Inventors: Thomas Davies, Guildford (GB); James Barrett, Manchester (GB)

(73) Assignee: British Broadcasting Corporation, London (GB)

( * ) Notice: Subject to any disclaimer, the term of this patent is extended or adjusted under 35 U.S.C. 154(b) by 716 days.

(21) Appl. No.: 13/383,229

(22) PCT Filed: Jul. 9, 2010

(86) PCT No.: PCT/EP2010/059945
§ 371 (c)(1),
(2), (4) Date: Mar. 19, 2012

(87) PCT Pub. No.: WO2011/004027
PCT Pub. Date: Jan. 13, 2011

(65) Prior Publication Data
US 2012/0163450 A1    Jun. 28, 2012

(30) Foreign Application Priority Data

Jul. 10, 2009  (EP) .................. PCT/EP2009/058879
Jul. 10, 2009  (EP) .................. PCT/EP2009/058880

(51) Int. Cl.
*H04N 7/12*       (2006.01)
*H04N 19/174*     (2014.01)
(Continued)

(52) U.S. Cl.
CPC .......... *H04N 19/174* (2014.11); *H04N 19/11* (2014.11); *H04N 19/136* (2014.11); *H04N 19/172* (2014.11); *H04N 19/176* (2014.11); *H04N 19/593* (2014.11); *H04N 19/61* (2014.11)

(58) Field of Classification Search
USPC ................................. 375/240.03
See application file for complete search history.

(56) References Cited

U.S. PATENT DOCUMENTS 6,212,236 B1*  4/2001  Nishida et al. .......... 375/240.12
2006/0104360 A1*  5/2006  Gordon .................... 375/240.16
(Continued)

FOREIGN PATENT DOCUMENTS

JP    H10-145795 A    5/1985
JP    H7-162870 A     6/1995
(Continued)

OTHER PUBLICATIONS

Munteanu, Adrian et al., "Applying Open-Loop Coding in Predictive Coding System," Advanced Concepts for Intelligent Vision Systems 10th International Conference, ACIVS 2008, Juan-les-Pins, France, Oct. 20 to 24, 2008, Proceedings, Springer Berlin Hidelberg, Oct. 20, 2008, p. 25 to 37.
(Continued)

*Primary Examiner* — Tracy Li
(74) *Attorney, Agent, or Firm* — Michael Best & Friedrich LLP (57) ABSTRACT

In a method of video coding, in which a difference is formed between input picture values and picture prediction values and that difference is transforming with a DCT, the picture prediction is formed as: $P=(1-c)P^c+CP^o$ where $P^c$ is a closed loop predictor which is restricted to prediction values capable of exact reconstruction in a downstream decoder and $P^o$ is a spatial predictor which is not restricted to prediction values capable of exact reconstruction. The factor can vary from zero to unity depending on a variety of parameters.

3 Claims, 3 Drawing Sheets (51) Int. Cl.
*H04N 19/176* (2014.01)
*H04N 19/172* (2014.01)
*H04N 19/61* (2014.01)
*H04N 19/593* (2014.01)
*H04N 19/11* (2014.01)
*H04N 19/136* (2014.01)

(56) References Cited

U.S. PATENT DOCUMENTS

| | | | | |
|---|---|---|---|---|
| 2006/0176957 | A1* | 8/2006 | Han et al. | 375/240.16 |
| 2008/0056356 | A1* | 3/2008 | Wang et al. | 375/240.12 |
| 2010/0239002 | A1* | 9/2010 | Park et al. | 375/240.12 |

FOREIGN PATENT DOCUMENTS

| | | |
|---|---|---|
| JP | 2007-503777 A | 2/2007 |
| JP | 2008-245131 A | 10/2008 |
| WO | 2008/004940 | 1/2008 |

OTHER PUBLICATIONS

Verbist, Frederik et al., "Intra-frame Video Coding using an Open-loop Predictive Coding Approach," Multimedia Signal Processing, 2008 IEEE 10th Workshop on, IEEE, Oct. 8, 2008, p. 273 to 277.

Official Action received in Japanese patent application No. 2012-519020, dated May 20, 2014 (with English translation of relevant sections).

Adrian Munteanu et al: "Applying Open-Loop Coding in Predictive Coding Systems", Oct. 20, 2008, Advanced Concepts for Intelligent Vision Systems; [Lecture Notes in Computer Science], Springer Berlin Heidelberg, Berlin, Heidelberg, pp. 25-37, XP019108416, ISBN: 978-3-540-88457-6.

Schwarz H et al: "SVC overview", ITU Study Group 16—Video Coding Experts Group—ISO/IEC MPEG & ITU-T VCEG(ISO/IEC JTC1/SC29/WG11 and ITU-T SG16 Q6), XX, XX, No. JVT-U145, Oct. 20, 2006, XP030006791.

Steffen Kamp et al: "Quality scalable low delay video coding using leaky base layer prediction", Communications and Information Technologies, 2007. ISCIT '07. International Symposium on, IEEE, PI, Oct. 1, 2007, pp. 541-545, XP031166523, ISBN: 978-1-4244-0976-1.

Wiegand T et al: "Overview of the H.264/AVC video coding standard", IEEE Transactions on Circuits and Systems for Video Technology, IEEE Service Center, Piscataway, NJ, US LNKD-DOI:10.1109/TCSVT.2003.815165, vol. 13, No. 7, Jul. 1, 2003, pp. 560-576, XP011099249, ISSN: 1051-8215.

PCT/EP2010/059945 International Search Report and Written Opinion, 15 pages, dated Jan. 18, 2011.

\* cited by examiner

HYBRID OPEN-LOOP/CLOSED-LOOP COMPRESSION OF PICTURES

CROSS-REFERENCE TO RELATED APPLICATIONS

This patent application is a national stage filing under 35 U.S.C. 371 of International Application No. PCT/EP2010/059945, filed Jul. 9, 2010, which claims priority to International Application No. PCT/EP2009/058879, filed Jul. 10, 2009 and International Application No. PCT/EP2009/058880, filed Jul. 10, 2009, which are incorporated herein by reference in their entireties.

This invention relates to compression coding of pictures and especially to the coding of pictures in video sequences. The term picture is used here to include fields and frames.

An early idea in the compression of pictures, known as Differential Pulse Code Modulation (DPCM), was to transmit not a pixel value but the difference between that pixel value and a predicted value for that pixel. This differential approach can exploit spatial redundancy in a picture and can exploit both spatial and temporal redundancies in a video sequence of pictures.

As video compression techniques developed towards the well known MPEG compression schemes, attention focussed on the use of differential techniques in the temporal domain. With accurate motion measurement techniques defining motion vectors between blocks in successive pictures, inter-picture differences can be very small and coded highly efficiently. To exploit spatial redundancy, spatial transform techniques were preferred, and applied both to motion-predicted (inter-coded) and unpredicted (intra-coded) areas of the picture.

A well recognised video encoder thus included motion compensated prediction, DCT or other spatial transform, quantisation and variable length or other entropy coding.

Efforts have continued in MPEG and in other coding regimes to increase coding efficiency and to extend coding capability to HDTV and still higher picture resolutions.

One technique included in MPEG-4 Part 10/AVC/H.264 is to supplement the spatial transform with intra-picture prediction. In the decoder, data from blocks which have already been decoded and reconstructed can be used to provide a spatial prediction for the current block. In the encoder, this intra-prediction is of course made available through the local decoder.

This additional spatial prediction has been found to increase performance significantly, particularly for edge detail and for strongly directional texture, such as diagonal stripes.

Experiments have however shown that the increase in performance is greatest at small block sizes and that performance declines as block sizes increase. This is a problem first because transform coding gain is relatively poor for small block sizes and efficient transform coding demands large block sizes. Second, moves to higher definitions will necessarily involve still higher block sizes. To give some examples, intra-predictions have been found to work well with 4×4 block sizes. Moving to 8×8 blocks might give around 1 dB in transform coding gain, but spatial prediction becomes more complex and less effective. At HD resolutions and above, 16×16 blocks or larger transforms will be needed, (perhaps up to 64×64 for UHDTV).

A similar tension exists in motion-compensated prediction: larger block size requires that fewer motion vectors are encoded, and allows the use of larger transforms on the residual. However, it increases the likelihood that some part of the large block will be poorly predicted, perhaps because of the motion of some small object or part of an object within the block area.

The present invention addresses this tension between the small block size required for effective prediction and the large block size required (especially at increased definition) for effective transform coding gain.

Accordingly, the present invention consists in one aspect in a method of compression coding, comprising the steps of forming a difference between input picture values and picture prediction values; and transforming the difference; wherein a picture prediction is formed by the combination of a predictor $P^C$ which is restricted to prediction values capable of exact reconstruction in a downstream decoder and a spatial predictor $P^O$ which is not restricted to prediction values capable of exact reconstruction in a downstream decoder.

The spatial predictor $P^O$ may access pixels within the current block, so enabling effective intra-picture spatial prediction within blocks that are large enough for efficient transform coding.

The combination of the spatial predictor $P^O$ with a predictor $P^C$ which is restricted to prediction values capable of exact reconstruction in a downstream decoder may enable noise growth to be controlled. The combination may comprise a weighted sum of the respective outputs of the predictor $P^C$ and the predictor $P^O$, such as $$P=(1-c)P^C+cP^O$$

where c is a weighting factor variable between zero and unity.

Whilst c may be chosen so as to optimise control of noise growth and accuracy of prediction, the overall prediction does not in this example change in weight.

The factor c or more generally the relative weighting of the predictor $P^C$ and the predictor $P^O$, may vary with picture content.

Often, the predictor $P^C$ will be a spatial predictor, such as—for example—the described H.264 spatial predictor. In other arrangements, the predictor $P^C$ is a temporal predictor such as the well known motion compensated predictor in MPEG standards.

In another aspect, the present invention consists in a method of compression decoding a bitstream encoded as outlined above, comprising the steps of receiving a bitstream representing picture differences; exactly reconstructing the prediction values of the predictor $P^C$; inexactly reconstructing the prediction values of the predictor $P^O$; and using a combination of the reconstructed prediction values for summation with the picture differences.

In yet a further aspect, the present invention consists in a video compression encoder comprising: a block splitter receiving picture information and splitting the picture information into spatial blocks; a block predictor operating on a block to provide block prediction values for the block; subtractor means receiving picture information and prediction values and forming difference values; a block transform conducting a spatial transform to provide transform coefficients; a quantisation unit for producing approximations to the transform coefficients; an entropy coding unit for encoding transform coefficients into a coded bitstream; an inverse quantisation unit for reconstructing transform coefficients; an inverse block transform conducting an inverse spatial transform on the transform coefficients to provide locally decoded picture values; and a local decoder predictor operating on the locally decoded picture values to provide local decoder prediction values, wherein the prediction values received by said subtractor means comprise a combination of the block prediction values and the local decoder prediction values.

In this aspect, the present invention also consist in a video compression decoder comprising: an input receiving a compression encoded bitstream representing transformed picture differences organised in blocks; an inverse quantisation unit providing re-scaled transform coefficients; an inverse block transform conducting an inverse spatial transform on the transform coefficients to provide decoded picture values; and a predictor operating on the decoded picture values to provide prediction values for summation with said picture differences, wherein the predictor comprises a closed predictor operating wholly outside a particular block to provide closed prediction values for summation with picture differences in that block and an open predictor operating at least partly inside a particular block to provide open prediction values for summation with picture differences in that block; the prediction values comprising a combination of the closed prediction values and the open prediction values.

In still a further aspect, the present invention consists in a video compression system comprising in an encoder: block splitter means for receiving picture information and splitting the picture information into spatial blocks; block predictor means for operating on a block to provide block prediction values for the block; subtractor means for receiving picture information and prediction values and forming picture difference values; block transform means for conducting a spatial transform on the picture difference values to provide transform coefficients; quantisation means for approximating transform coefficients; inverse quantisation means for reconstructing transform coefficients; inverse block transform means for conducting an inverse spatial transform on the transform coefficients to provide locally decoded picture values; local decoder predictor means for operating on the locally decoded picture values to provide local decoder prediction values, wherein the prediction values received by said subtractor means comprise a variable combination of the block prediction values and the local decoder prediction values; and means for outputting a compression encoded bitstream representing the quantised transform coefficients and including a parameter recording variation of said combination, and further comprising in a decoder: receiving said compression encoded bitstream: inverse block transform means for conducting an inverse spatial transform on the transform coefficients to provide decoded picture values; inverse quantisation means for reconstructing transform coefficients; and predictor means operating on the decoded picture values to provide prediction values for summation with said picture differences, wherein the predictor means comprises a closed predictor operating wholly outside a particular block to provide closed prediction values for summation with picture differences in that block and an open predictor operating at least partly inside a particular block to provide open prediction values for summation with picture differences in that block; the prediction values comprising a varying combination of the closed prediction values and the open prediction values, the combination being varied by the prediction means in accordance with said parameter in the bitstream.

Suitably, wherein the picture prediction values P are formed as:

$$P=(1-c)P^C+cP^O$$

where $P^O$ is the block prediction values; $P^C$ is local decoder prediction values; and c is a weighting factor variable between zero and unity.

In another aspect the present invention consists in a method of compression coding, comprising the steps of forming a difference between input picture values and picture prediction values; and transforming the difference; wherein a picture prediction is formed by the combination of a closed loop predictor (CLP) which is restricted to prediction values capable of exact reconstruction in a downstream decoder and an open loop predictor (OLP) which is not restricted to prediction values capable of exact reconstruction in a downstream decoder, wherein the open loop predictor and the transform are in the same temporal or spatial domain.

Suitably, the combination comprises a weighted sum of the respective outputs of the CLP and the OLP in which the relative weighting of the CLP and the OLP may vary with picture content. The picture prediction P is formed as:

$$P=(1-c)P^c+cP^o$$

where c is a weighting factor variable between zero and unity, $P^c$ is the prediction value of the CLP and $P^o$ is the prediction value of the OLP.

In one variation, the CLP is a spatial predictor and the OLP is a spatial predictor. The CLP may predict a block from neighbouring, previously coded blocks in the same picture. The OLP may be a pixelwise spatial predictor taking the mean or other combination of adjacent pixels in the same transform block. The spatial transform may be selected form the group consisting of a block transform; a discrete cosine transform (DCT); a discrete sine transform (DST); a wavelet transform; a blocked wavelet transform; a Lapped Orthogonal Transform (LOT); a blocked LOT; or approximations to any of the preceding. The spatial predictions may be performed after motion-compensated prediction i.e. on a motion compensated prediction residue.

In another variation, the CLP is a motion-compensated prediction (or combination of motion compensated predictions) from previously-coded pictures and the OLP is a spatial predictor. The CLP may be a block-based motion compensated prediction. The OLP may be a pixelwise spatial predictor taking the mean or other combination mean of adjacent pixels in the same transform block. The spatial transform may be selected form the group consisting of a block transform; a discrete cosine transform (DCT); a discrete sine transform (DST); a wavelet transform; a blocked wavelet transform; a Lapped Orthogonal Transform (LOT); a blocked LOT; or approximations to any of the preceding.

In still another variation, the CLP is a spatial predictor and the OLP is a motion-compensated prediction (or combination of motion compensated predictions) from previously-coded pictures. The OLP may be a block-based motion compensated prediction. The CLP may be a spatial predictor from previously-coded blocks in the same picture. The temporal transform is selected form the group consisting of a block transform; a discrete cosine transform (DCT); a discrete sine transform (DST); a wavelet transform; a blocked wavelet transform; a Lapped Orthogonal Transform (LOT); a blocked LOT; or approximations to any of the preceding.

In yet a further variation, the CLP and the OLP are motion-compensated predictions (or combinations of motion compensated predictions) from previously-coded pictures. The OLP may be a block-based motion compensated prediction. The CLP may be a block-based motion compensated prediction. The temporal transform may be selected form the group consisting of a block transform; a discrete cosine transform (DCT); a discrete sine transform (DST); a wavelet transform; a blocked wavelet transform; a Lapped Orthogonal Transform (LOT); a blocked LOT; or approximations to any of the preceding.

A combination factor c may vary, for example, block by block, or frame by frame or group of pictures (GOP) by GOP. The combination factor may vary within a transform block according to some pre-determined pattern or patterns. The combination factor may be contained in additional meta-data and conveyed alongside the coded data. The chosen pattern may be encoded by means of an index or flag conveyed alongside the coded data.

The gain of the two predictors may sum to unity.

In another aspect, the present invention consists in a method of compression decoding a bitstream encoded in accordance with any one of the preceding claims, comprising the steps of receiving a bitstream representing picture differences; exactly reconstructing the prediction values of the predictor $P^c$; inexactly reconstructing the prediction values of the predictor $P^o$; and using a combination of the reconstructed prediction values for summation with the picture differences.

Consider a set of frames, say 4 frames $F_N$, $F_{N+1}$, $F_{N+2}$, $F_{N+3}$ where all frames prior to $F_N$ have been coded.

For each block in $F_k$, (k=N, N+1, N+2, N+3) one could have two motion vectors, one representing a closed loop predictor from frames prior to $F_N$, and the other representing an open loop predictor from frames within the set—for example, just from the previous frame. Both sets of motion vectors would be transmitted.

The frames could be motion compensated using reconstructed data where possible and original data where not, each block having one motion vector of each sort and using a mixed prediction.

Then a temporal transform could be applied to the 4 frames, for example a 4-point DCT or Hadamard transform, additionally to any spatial transform applied in the blocks. The block coefficients would be quantised and coded.

At the decoder all four frames would be decoded at once, since they were transformed together. After inverse transform (spatial and temporal) this gives 4 residue frames. Using the motion vectors provided, motion compensation can be applied using reconstructed data. If the open loop prediction is always from the previous frame, then reconstructed data is always available if the frames are processed in order.

Note that although the terms "previous" and "later" have been used The order of the frames need not be true temporal order in an application—there may have been some temporal reordering to allow for later references as well as earlier ones to be available. So these terms can also mean earlier or later in coding order.

The invention will now be described by way of example with reference to the accompanying drawings, in which.

Figure 1:
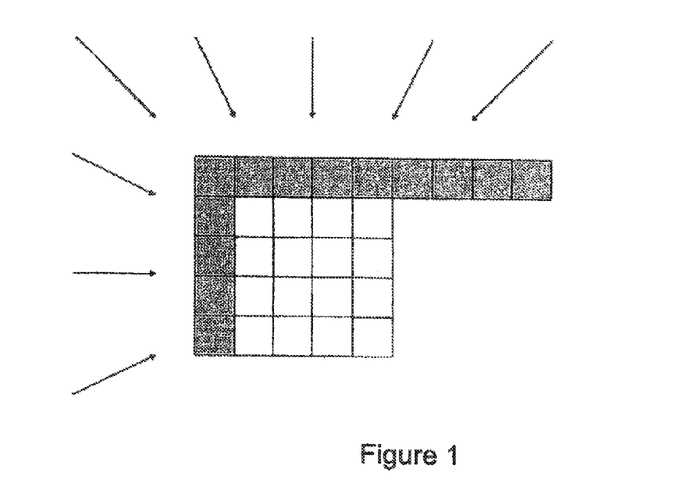
FIG. 1 is a diagram illustrating a known spatial prediction technique.

As has been mentioned MPEG Part 10/AVC/H.264 (from here referred to as H.264 for convenience) contains an addition to previous MPEG standards, which is the provision for intra prediction of blocks. Data along the top and to the left of a block, which has been decoded and reconstructed already, can be used to provide a prediction for the current block which can now be coded differentially. FIG. 1 shows the 8 possible directional predictions that can be used for 4×4 blocks (previously reconstructed samples are shaded). In addition to these directional predictions, the DC can be predicted from the mean of pixels at the edges of the block, giving 9 modes in all. Other predictions are available for 16×16 and 8×8 blocks.

The H264 intra prediction tool showed the advantage of combining spatial predictive coding with transform coding. It was particularly effective for edge detail and for strongly directional texture, such as diagonal stripes.

There is however one problem in the inherent tension between the small blocks required to produce a good prediction, and the large blocks required to get good transform coding gain.

The decrease in efficiency in spatial prediction coding with increasing block size can be understood to arise from the increasing distance (at least towards the end of a raster scanned block) between the current pixel and the pixels upon which the prediction is based. As that distance increases, correlation between pixels reduces and so also does differential coding efficiency.

Likewise, motion compensated prediction has formed an essential part of video compression standards since MPEG-1. A key issue is the trade-off between block size and prediction accuracy. Larger block sizes require fewer motion vectors to be coded, but have less prediction accuracy, since small objects or parts of objects in a large block may move differentially with respect to the rest of the block. Transform block sizes are consequentially constrained since block transforms are generally applied wholly within a prediction block, to avoid the difficulties of transforming the transitions from one block to another. In H264, these trade-offs may be achieved by selecting from among a very wide variety of motion block partitions.

What would be desirable is to predict at a finer grain than the transform may allow. However, within a block, the samples available to the decoder are those that have been decoded and reconstructed. The samples used in the encoder are the original samples, which are different due to subsequent quantisation. The prediction would in this sense be open loop, in contrast to the closed loop that is provided where a local decoder within the encoder guarantees that the prediction values used by the encoder can be exactly reconstructed in the decoder. This difference could cause significant noise growth To see how the reconstruction noise can grow, let $P(x_0, \ldots, x_{r-1})$ denote the prediction of sample $x_r$ from samples $x_k$, k=0, ..., r−1. Then the prediction residues $y_r$ are given by:

$$y_r = x_r - P(x_0, \ldots, x_{r-1})$$

Let $L = T^{-1}Q^{-1}QT$ denote the process of transforming, quantising, inverse quantising and inverse transforming the sequence $y_r$. We can assume for the moment that the effect of L is to add a noise source $n_r$ of variance $\sigma^2$ to $y_r$, i.e.

$$Y_r = L(y_r) = y_r + n_r$$

In reconstructing, the decoder will form $$X_r = Y_r + P(X_0, \ldots, X_{r-1})$$

In addition to the noise $n_r$ on $Y_r$, the prediction will differ because of the noise on each of the previous reconstructed values X, and this noise can therefore grow. In particular, since a good predictor P will typically have unity gain at DC, meaning that 1−P has a zero and the inverse filter will have a pole i.e. infinite gain at DC. Thus noise can grow in an unbounded fashion. A closed-loop predictor, in which the predictor uses the reconstructed values $X_0$ at the encoder also, will not have this problem.

There is thus a problem that a closed-loop predictor in conjunction with a transform encoder is limited either in the accuracy of the prediction (if the block is large) or in the efficiency of the transform (if the block is small); and an open-loop predictor can suffer from unbounded noise gain.

A solution to this problem will now be described.

Mathematically, define $P^C$ and $P^O$ to be two predictors. At the encoder $P^C$ will be applied closed-loop, to produce a prediction constructed solely from previously coded and reconstructed coefficients; $P^O$ will be applied open-loop, that is it will be applied to produce predictions from original uncoded coefficients. Of course, at the decoder both predictions must use reconstructed coefficients.

An example of $P^C$ would be to predict pixels in a block by the mean of pixels in neighbouring blocks. An example of $P^O$ would be to predict a pixel from immediately neighbouring pixels, whether they fall in the same block or not. Then a new combined predictor P can be created by, $$P=(1-c)P^C+cP^O$$

In this case, a factor c applies to $P^O$. If this factor c is between zero and unity it acts as a damping or leakiness factor on the noise contributed by the open-loop predictor in the decoder, and this controls noise growth. Yet the combined predictor remains an excellent predictor due to the complementary contribution of the closed-loop predictor, whereas without a complementary closed-loop predictor the efficacy of the prediction would fall as the factor c got smaller. In particular, if both predictors eliminate DC, then so will the combined predictor.

Figure 2:
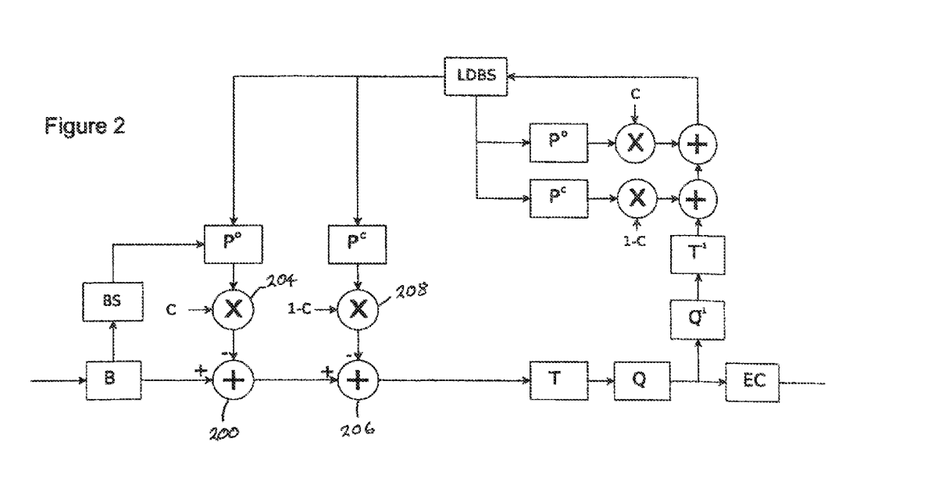
FIG. 2 is a block diagram of an encoder.

An example of an encoder architecture is shown in FIG. 2. Input video is received at block splitter B which serves to split the input data into blocks. The block information is supplied to a block store BS and to a subtractor (200). Block store BS provides data to an open loop predictor $P^O$. This predictor operates within the block to provide a prediction value for the current pixel. The predicted value takes the form, in one example, of the arithmetic mean of the three pixels, respectively: horizontally to the left, diagonally to the top left and vertically above the current pixel. It will be understood that a predicted value can be formed in a variety of other ways, utilising further or different neighbouring pixels and applying different weightings to different neighbouring pixels.

The predicted value from $P^O$ is supplied as the negative input to subtractor (200) via a multiplier (204) which applies a gain factor c. The parameter c may typically vary between zero and unity. This gain control, when c is less than unity, addresses the problem of noise growth that would otherwise be associated with the use of an open loop predictor.

The output from the subtractor (200) passes through a second subtractor (204) to a conventional DCT or other spatial transform block T. The transform T operates on the received picture difference to provide transform coefficients to a generally conventional quantiser block Q. The quantised transform coefficients undergo variable length or other entropy coding in block EC to provide the output bitstream of the encoder.

To provide the closed loop prediction, a locally decoded block store LDBS is maintained containing values that have been reconstructed just as they would be in the decoder, using only previously reconstructed data values. The closed loop spatial prediction may conveniently take the form of the known H.264 spatial predictor or motion compensated predictors.

The closed loop prediction values are passed as a negative input to subtractor via multiplier applying a gain control factor of (1-c).

Values from the LDBS are constructed by means of an inverse quantiser block $Q^{-1}$, an inverse transform block $T^{-1}$, and the addition of predictions in the same proportions but using only previously-decoded reconstructed values from the LDBS itself.

Note that in block operation, the feed-forward predictor $P^O$ can also use reconstructed samples where they are available, at the top and left of a block if we assume blocks are scanned in raster order. Thus the samples input to $P^C$ are also input to $P^O$. This means that wherever possible the predictions use reconstructed samples.

Figure 3:
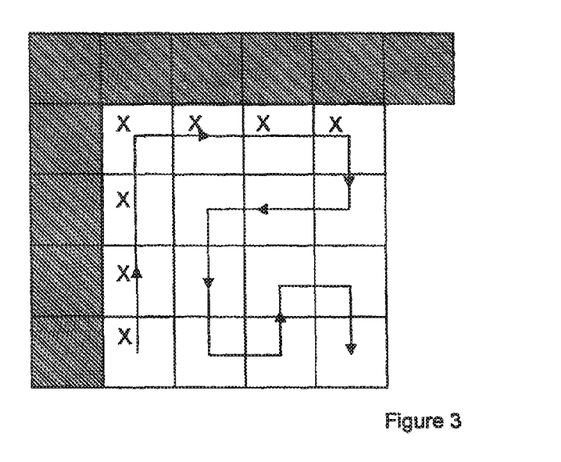
FIG. 3 is a diagram illustrating spatial prediction.

Thus, referring to FIG. 3, the pixels in the top row and the left column of the current 4×4 block (marked X in the figure) can be predicted entirely or mostly from locally decoded pixels (outside the current block) which are shown cross hatched in the figure. The result should be to restrict the growth of noise still further by synchronising the prediction in encoder and decoder each block.

Since there will be little or no divergence between encoder and decoder on the top and left of the block, a lower degree of leakiness may be required there, thus allowing for better prediction to be used in these areas. In other words, the parameter c may—in addition to any variation in accordance with picture content—may vary with the position of the current pixel in the block. This variation with pixel position need not necessarily be signalled in the bitstream; it may for example form part of an industry or de facto standard.

In this approach, the coefficient order for the prediction and difference generation will not be a raster order but will be block-by-block, scanning coefficients within each block before moving on to the next one. Raster scanning within a block could be used, but other scan patterns may give a better result, for example scanning in concentric 'L' shapes as shown in FIG. 3.

Since the total prediction now has no weighting factor, this architecture allows for varying the degree of leakiness across a block without introducing spurious frequency components.

If c is fixed, a useful value has been found to be around 0.5.

The parameter c may be optimised for different picture content depending on the block sizes used, the quantisation parameters selected and the relative success of the two predictions. Small block sizes and low levels of quantisation will in general produce less divergence between the encoder and decoder open loop predictions, and so the overall value of c could be adjusted closer to unity in these circumstances, either through encoding in the bitstream or according to the governing standard.

This system is particularly attractive since it can be combined easily with a whole range of different predictors. For example, $P^C$ could be a directional predictor already defined in H264, and $P^O$ could be a directional pixelwise predictor. Alternatively $P^C$ could be a motion compensated temporal predictor.

Or, for wavelet coding, one could do a form of hierarchical coding where the low-pass coefficients provide a closed-loop prediction at each level.

In a further variation, a fixed number of possible values of c could be pre-determined, with an encoder able to choose the best value to use for a particular block or set of blocks, or to choose only to use the closed-loop predictor. Meta-data could be sent accompanying the transform coefficients of each block or set of blocks to indicate whether an open-loop prediction has been used, and which value of c has been employed.

For example, 4 possible non-zero values of c may be used, perhaps ¼, ½, ¾ and 1. Values of $^{15}/_{32}$, $^{25}/_{32}$, $^{10}/_{32}$ and $^{22}/_{32}$ have been shown to work well. An encoder would select an optimum value to use, normally by some rate-distortion optimisation method.

In a yet further variation, the value c may be fixed but the open-loop prediction may vary among a number of possible predictors. Meta-data could be sent accompanying the transform coefficients of each block or set of blocks to indicate whether an open-loop prediction has been used and if so which has been used.

For example, 4 different directional spatial predictors may be used: a horizontal predictor, a vertical predictor, and two diagonal predictors at 45 degree angles to these vertical and horizontal predictors.

Meta-data for configuring the prediction methods for an individual block or a set of blocks may be encoded by well-known methods for encoding configurable options in existing video standards. For example, an encoder may first encode a flag indicating the presence or absence of an open-loop predictor. If an open-loop predictor is present, the option selected could be encoded in a number of bits. A typical scheme would allow $2^N$ options, encoded in N bits, as in the following pseudocode for case N=2:

```
EncodeBit(using_open_loop);
if (1==using_open_loop){
    EncodeBit(combined_pred_mode & 0x01);
    EncodeBit((combined_pred_mode & 0x02)>>1);
}
```

Alternatively, there may be some correlation between the metadata of one block and that of previously coded blocks. In that case an encoder may follow a scheme similar to that used for coding intra prediction modes in H.264. It may consider the case where the open loop in not used as an additional prediction mode, making $2^N+1$ options. A flag is then coded indicating whether the prediction is used. If it is not, then the remaining $2^N$ modes can be coded using N bits as illustrated in the following pseudocode for case N=2:

```
predicted_mode = get_mode_prediction( );
EncodeBit(combined_pred_mode==predicted_mode);
if (combined_pred_mode<predicted_mode){
    EncodeBit(combined_pred_mode & 0x01);
    EncodeBit((combined_pred_mode & 0x02)>>1);
}
else if (combined_pred_mode>predicted_mode){
    combined_pred_mode = combined_pred_mode-1;
    EncodeBit(combined_pred_mode & 0x01);
    EncodeBit((combined_pred_mode & 0x02)>>1);
}
```

Figure 4:
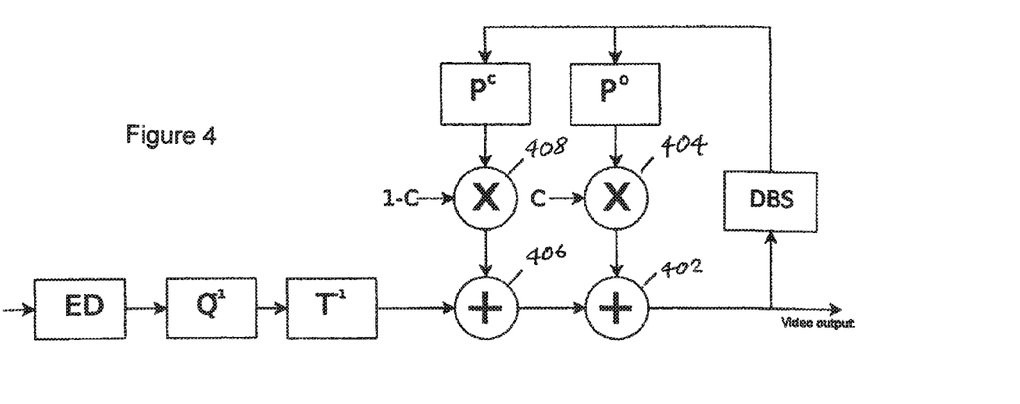
FIG. 4 is a block diagram of an encoder.

A decoder architecture is shown in FIG. 4. In the decoder, the bitstream is received by an entropy decoding block ED and passes through an inverse quantiser block $Q^{-1}$ and an inverse transform block $T^{-1}$. The output of the inverse transform block is passed to the input of a decoded block store DBS. Decoded data from the decoded block store is passed to the inputs of a closed loop predictor $P^C$ and an open loop protector $P^O$. The output of $P^O$ is passed to an adder (402) through a multiplier (404) applying a gain control factor c. The output of predictor $P^C$ is applied to an adder (406) through a multiplier (408) applying gain control factor (1-c). Both the open-loop predictor $P^O$ and the gain control factor c may be selectable based on meta-data transmitted by the encoder. The two adders serve to add the weighted prediction outputs to the values output from the inverse transform block. Once reconstructed, the values are passed into the DBS for use in predicting subsequent values.

The input to the DBS of course also provides the video output from the decoder.

Optimum predictors can be selected of by adaptive means. Predictors may be chosen, for example, by linear optimisation techniques, minimising mean square error, or by determining and extrapolating local gradients. Whatever the method, a fundamental distinction is between continuous adaptive techniques, whereby the choice of predictor is a continuous function of values in a neighbourhood of the current pixel, and discontinuous techniques in which the predictor is switched.

Operating open-loop, in any adaptive technique the adaptive predictor itself could differ between encoder and decoder. Discontinuous adaptive techniques would appear especially dangerous, since very different predictors could be chosen. In a continuous system, given similar values, similar predictors would be chosen.

As an example of continuous adaption, it can be shown that if pixels are scanned to produce a sequence x(n) with autocorrelation R(k), then the MMSE predictor $$P(x, n) = \sum_{k=1}^{N} a_r x(n - r)$$

has coefficients $a_k$ which satisfy the system of TV linear equations $$R(j) - \sum_{k=1}^{N} a_k R(j-k), j = 1, \ldots, N$$

Therefore an adaptive system can be obtained by taking a rolling snapshot of the signal and solving this system. A more tractable adaption method which would approximate this (and converge to it, given stationary statistics) would be to use the LMS or RLS algorithms.

In this case both the basic samples and the autocorrelation functions would be different between encoder and decoder, causing different filters to be used. This might well not be significant, however, if the prediction could be much better. The adaption could be made more stable by assuming a degree of white noise, for example by adding a small delta impulse to the measured autocorrelation R(k), or by directly adding artificial noise to the feedback signal in the LMS/RLS algorithm.

The architectures described above involve predictions using the original, uncoded samples. It is this that causes the noise addition from the prediction process. However, in a compression system an encoder is able to use any samples it likes to generate a bit stream: it is only decoder processes that need to be specified. So the encoder may modify the samples used for prediction in order that they are closer to the samples that the decoder uses for reconstruction. With open-loop predictors, it cannot be guaranteed that the samples are identical, but multiple passes should provide some degree of convergence.

Figure 5:
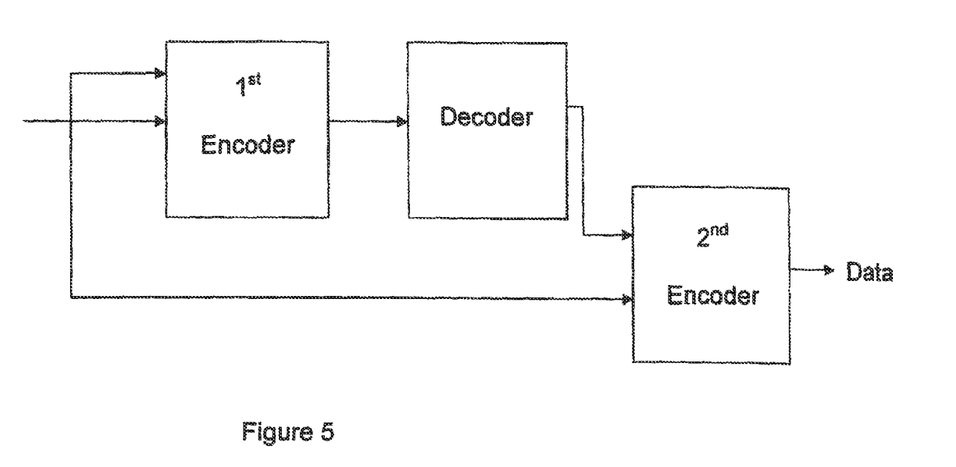
FIGS. 5 and 6 are block diagrams illustrating multi-pass encoding techniques.
Figure 6:
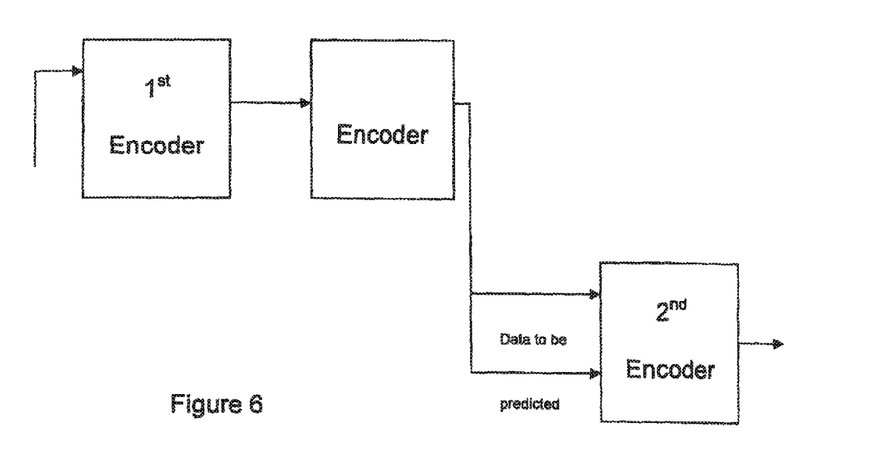

The way to do this is to concatenate two (or more) encoders, so that the prediction utilises data that has been coded and locally decoded by a first encoder. In this case an element of feedback has been reintroduced into the encoding process. Block diagram are shown in FIGS. 5 and 6. Here a first encoder performs the initial coding in the manner described above. A decoder again as described above then produces a first-pass decoded signal, which is then passed to the second encoder. Of course, whilst the first and second encoders are drawn separately, they will typically constitute first and second passes of one hardware or software encoder.

Two basic variants may be considered. In the first, shown in FIG. 5, only the predictor of the second encoder uses the locally decoded version, but the pixels being predicted remain the original ones (with a compensating delay to account for the first-pass encode and decode). In the second, shown in FIG. 6, both prediction and predicted pixels would use a locally decoded version. Any number of these stages may be concatenated in order to achieve greater convergence between encoder and decoder prediction coding processes.

It will be understood that this invention has been described only by way of example and that a wide variety of modifications are possible without departing from the scope of the appended claims. To the extent that described examples include separate features and options, all practicable combinations of such features and options are to be regarded as disclosed herein. Specifically, the subject matter of any one of the claims appended hereto is to be regarded as disclosed in combination with the subject matter of every other claim.

The invention claimed is:

1. A video compression decoder comprising:
   an input receiving a compression encoded bitstream representing transformed pixel differences;
   an inverse quantisation unit providing re-scaled transform coefficients;
   an inverse block transform conducting an inverse spatial transform on the transform coefficients to provide decoded pixel differences;
   a predictor arrangement operating on decoded picture values to provide pixel prediction values for summation with said pixel differences, and
   an adder arrangement for summing said pixel prediction values and a current block of said pixel differences to form a current block of decoded picture values;
   wherein the predictor arrangement includes:
      a first predictor operating wholly outside the current block of decoded picture values to provide first pixel prediction values for summation with pixel differences in said current block of pixel differences; and
      a second predictor operating at least partly inside said current block of decoded picture values to provide second pixel prediction values for summation with pixel differences in said current block of pixel differences; and
   wherein the pixel prediction values include a combination of the first pixel prediction values and the second pixel prediction values.

2. A decoder according to claim 1, wherein said combination of the first pixel prediction values and the second pixel prediction values varies and parameter values in the encoded bitstream control variation of said combination.

3. A method of decoding compressed video, the method comprising:
   receiving, at an input, a compression encoded bitstream representing transformed pixel differences;
   providing, via an inverse quantisation unit, re-scaled transform coefficients;
   conducting, via an inverse block transform, an inverse spatial transform on the transform coefficients to provide decoded pixel differences;
   operating, via a predictor arrangement, on the decoded picture values to provide pixel prediction values for summation with said pixel differences; and
   summing said pixel prediction values and a current block of said pixel differences to form a current block of decoded picture values;
   wherein the predictor arrangement includes:
      a first predictor operating wholly outside the current block of decoded picture values to provide first pixel prediction values for summation with pixel differences in said current block of pixel differences; and
      a second predictor operating at least partly inside said current block of decoded picture values to provide second pixel prediction values for summation with pixel differences in said current block of decoded picture values; and
   wherein the prediction values include a combination of the first pixel prediction values and the second pixel prediction values.

\* \* \* \* \*